(12) United States Patent
Downie et al.

(10) Patent No.: US 7,547,150 B2
(45) Date of Patent: Jun. 16, 2009

(54) OPTICALLY ADDRESSED RFID ELEMENTS

(75) Inventors: John D. Downie, Painted Post, NY (US); Matthew S. Whiting, Lawrenceville, PA (US); James S. Sutherland, Corning, NY (US); Richard E. Wagner, Painted Post, NY (US); Leo Nederiof, Antwerp (BE)

(73) Assignee: Corning Cable Systems, LLC, Hickory, NC (US)

(*) Notice: Subject to any disclaimer, the term of this patent is extended or adjusted under 35 U.S.C. 154(b) by 0 days.

(21) Appl. No.: 11/716,414

(22) Filed: Mar. 9, 2007

(65) Prior Publication Data

US 2008/0218355 A1    Sep. 11, 2008

(51) Int. Cl.
G02B 6/36 (2006.01)
G08B 13/14 (2006.01)
H04Q 5/22 (2006.01)

(52) U.S. Cl. .................. 385/92; 340/10.1; 340/572.7; 340/572.8

(58) Field of Classification Search .............. 385/48
See application file for complete search history.

(56) References Cited

U.S. PATENT DOCUMENTS

| | | | |
|---|---|---|---|
| 3,052,842 A | 9/1962 | Frohman et al. | |
| 3,609,742 A | 9/1971 | Burdick | |
| 4,200,862 A | 4/1980 | Campbell et al. | |
| 4,418,333 A | 11/1983 | Schwarzbach et al. | |
| 4,630,886 A | 12/1986 | Lauriello et al. | |
| 4,889,977 A | 12/1989 | Haydon | 235/375 |
| 4,915,639 A | 4/1990 | Cohn et al. | |
| 4,968,929 A | 11/1990 | Hauck et al. | |
| 5,337,400 A | 8/1994 | Morin et al. | |
| 5,353,367 A | 10/1994 | Czosnowski et al. | |
| 5,394,503 A | 2/1995 | Dietz, Jr. et al. | |
| 5,448,675 A | 9/1995 | Leone et al. | |
| 5,461,693 A | 10/1995 | Pimpinella | |
| 5,473,715 A | 12/1995 | Schofield et al. | |
| 5,483,467 A | 1/1996 | Krupka | |
| 5,528,222 A | 6/1996 | Moskowitz et al. | |
| 5,692,925 A | 12/1997 | Bogese | |
| 5,764,043 A | 6/1998 | Czosnowski et al. | |
| 5,821,510 A | 10/1998 | Cohen et al. | 235/375 |

(Continued)

FOREIGN PATENT DOCUMENTS

DE        19841738         3/2000

(Continued)

OTHER PUBLICATIONS

Patent Cooperation Treaty, International Search Report for International Application No. PCT/US2008/003100, Jul. 24, 2008, 1 page.

*Primary Examiner*—Tina M Wong
(74) *Attorney, Agent, or Firm*—Kwadjo Adusei-Poku (57) ABSTRACT

There are provided connectors, cables, cable assemblies, network components, and systems wherein optically addressed RFID functionality is incorporated. Also provided are optically addressed RFID elements in general. The RFID elements utilize an optical tap to direct a portion of the optical signal traveling through an optical fiber to a transducer. The transducer creates an electrical signal which may be used to write information to an integrated circuit of, transmit an RF signal to, and/or provide power to the RFID element.

45 Claims, 4 Drawing Sheets

U.S. PATENT DOCUMENTS

| | | |
|---|---|---|
| 5,847,557 A | 12/1998 | Fincher et al. |
| 5,854,824 A | 12/1998 | Bengal et al. |
| 5,859,719 A | 1/1999 | Dentai et al. ............... 359/171 |
| 5,910,776 A | 6/1999 | Black ................... 340/825.35 |
| 5,914,862 A | 6/1999 | Ferguson et al. |
| 5,995,006 A | 11/1999 | Walsh |
| 5,999,400 A | 12/1999 | Belopolsky et al. |
| 6,002,331 A | 12/1999 | Laor ........................ 340/539 |
| 6,025,725 A | 2/2000 | Gershenfeld et al. |
| 6,100,804 A | 8/2000 | Brady et al. |
| 6,118,379 A | 9/2000 | Kodukula et al. |
| 6,126,610 A | 10/2000 | Rich et al. |
| 6,127,929 A | 10/2000 | Roz |
| 6,133,835 A | 10/2000 | De Leeuw et al. |
| 6,164,551 A | 12/2000 | Altwasser |
| 6,222,908 B1 | 4/2001 | Bartolutti et al. |
| 6,222,975 B1 | 4/2001 | Gilbert et al. |
| 6,232,870 B1 | 5/2001 | Garber et al. ............... 340/10.1 |
| 6,234,830 B1 | 5/2001 | Ensz et al. |
| 6,243,654 B1 | 6/2001 | Johnson et al. |
| 6,285,293 B1 | 9/2001 | German et al. |
| 6,298,255 B1 | 10/2001 | Cordero et al. |
| 6,330,307 B1 | 12/2001 | Bloch et al. |
| 6,350,148 B1 | 2/2002 | Bartolutti et al. |
| 6,368,155 B1 | 4/2002 | Bassler et al. |
| 6,375,362 B1 | 4/2002 | Heiles et al. |
| 6,378,111 B1 | 4/2002 | Brenner et al. |
| 6,424,263 B1 | 7/2002 | Lee et al. |
| 6,424,315 B1 | 7/2002 | Glenn et al. |
| 6,424,710 B1 | 7/2002 | Bartolutti et al. |
| 6,469,404 B1 | 10/2002 | Pohjola |
| 6,496,113 B2 | 12/2002 | Lee et al. |
| 6,496,382 B1 | 12/2002 | Ferguson et al. |
| 6,522,308 B1 | 2/2003 | Mathieu |
| 6,522,737 B1 | 2/2003 | Bartolutti et al. |
| 6,574,586 B1 | 6/2003 | David et al. |
| 6,618,022 B2 | 9/2003 | Harvey |
| 6,684,179 B1 | 1/2004 | David |
| 6,688,910 B1 | 2/2004 | Macauley |
| 6,693,513 B2 | 2/2004 | Tuttle |
| 6,696,952 B2 | 2/2004 | Zirbes |
| 6,725,177 B2 | 4/2004 | David et al. |
| 6,773,306 B2 | 8/2004 | Plishner |
| 6,784,802 B1 | 8/2004 | Stanescu ................... 340/687 |
| 6,808,116 B1 | 10/2004 | Eslambolchi et al. |
| 6,829,427 B1 | 12/2004 | Becker |
| 6,831,443 B2 | 12/2004 | Liu |
| 6,846,115 B1 | 1/2005 | Shang et al. |
| 6,847,856 B1 | 1/2005 | Bohannon ................... 700/115 |
| 6,857,897 B2 | 2/2005 | Conn |
| 6,871,156 B2 | 3/2005 | Wallace et al. |
| 6,888,996 B2 | 5/2005 | Hwang et al. |
| 6,898,368 B2 | 5/2005 | Colombo et al. |
| 6,902,433 B1 | 6/2005 | Hashimoto et al. |
| 6,915,050 B2 | 7/2005 | Koyasu et al. |
| 6,917,763 B1 | 7/2005 | Au et al. |
| 6,924,997 B2 | 8/2005 | Chen et al. ................... 365/145 |
| 6,961,675 B2 | 11/2005 | David |
| 6,968,994 B1 | 11/2005 | Smith |
| 6,971,895 B2 | 12/2005 | Sago et al. |
| 6,973,243 B2 | 12/2005 | Koyasu et al. ............... 385/100 |
| 6,999,028 B2 | 2/2006 | Egbert |
| 7,014,100 B2 | 3/2006 | Zierolf |
| 7,016,726 B1 | 3/2006 | Picardo et al. |
| 7,024,089 B2 | 4/2006 | Weinert et al. |
| 7,027,704 B2 | 4/2006 | Frohlich et al. |
| 7,028,087 B2 | 4/2006 | Caveney |
| 7,028,202 B2 | 4/2006 | Long et al. |
| 7,046,899 B2 | 5/2006 | Colombo et al. |
| 7,062,139 B2 | 6/2006 | Shang |
| 7,068,912 B1 | 6/2006 | Becker |
| 7,069,345 B2 | 6/2006 | Shteyn |
| 7,080,945 B2 | 7/2006 | Colombo et al. |
| 7,081,808 B2 | 7/2006 | Colombo et al. |
| 7,096,077 B2 | 8/2006 | Price et al. |
| 7,102,520 B2 | 9/2006 | Liu et al. |
| 7,123,810 B2 | 10/2006 | Parrish |
| 7,140,782 B2 | 11/2006 | Frohlich et al. |
| 7,151,455 B2 | 12/2006 | Lindsay et al. |
| 7,158,031 B2 | 1/2007 | Tuttle |
| 7,158,033 B2 | 1/2007 | Forster |
| 7,160,143 B2 | 1/2007 | David et al. |
| 7,165,728 B2 | 1/2007 | Durrant et al. |
| 7,170,393 B2 | 1/2007 | Martin |
| 7,193,422 B2 | 3/2007 | Velleca et al. |
| 7,194,180 B2 | 3/2007 | Becker |
| 7,205,898 B2 | 4/2007 | Dixon et al. |
| 7,210,858 B2 | 5/2007 | Sago et al. |
| 7,221,277 B2 | 5/2007 | Caron et al. |
| 7,224,278 B2 | 5/2007 | Phaneuf et al. |
| 7,224,280 B2 | 5/2007 | Ferguson et al. |
| 7,226,217 B1 | 6/2007 | Benton et al. |
| 7,233,250 B2 | 6/2007 | Forster |
| 7,234,944 B2 | 6/2007 | Nordin et al. |
| 7,243,837 B2 | 7/2007 | Durrant et al. |
| 7,253,735 B2 | 8/2007 | Gengel et al. |
| 7,265,674 B2 | 9/2007 | Tuttle |
| 7,275,970 B2 | 10/2007 | Hoshina |
| 7,297,018 B2 | 11/2007 | Caveney et al. |
| 7,297,028 B2 | 11/2007 | Daikuhara et al. |
| 7,298,266 B2 | 11/2007 | Forster |
| 7,298,330 B2 | 11/2007 | Forster |
| 7,306,489 B2 | 12/2007 | Werthman et al. |
| 7,315,681 B2 * | 1/2008 | Kewitsch ................... 385/135 |
| 7,318,744 B2 | 1/2008 | Kuo |
| 7,336,883 B2 | 2/2008 | Scholtz |
| 7,349,605 B2 | 3/2008 | Noonan et al. |
| 7,352,285 B2 | 4/2008 | Sakama et al. |
| 7,352,289 B1 | 4/2008 | Harris |
| 7,354,298 B2 | 4/2008 | James |
| 7,356,208 B2 | 4/2008 | Becker |
| 2002/0071394 A1 | 6/2002 | Koziy et al. |
| 2002/0086584 A1 | 7/2002 | Liu |
| 2002/0092347 A1 | 7/2002 | Niekerk et al. ............. 73/146.2 |
| 2003/0021580 A1 | 1/2003 | Matthews |
| 2003/0061393 A1 | 3/2003 | Steegmans et al. |
| 2003/0154273 A1 | 8/2003 | Caveney |
| 2003/0154276 A1 | 8/2003 | Caveney |
| 2004/0041714 A1 | 3/2004 | Forster ................... 340/870.17 |
| 2004/0114879 A1 | 6/2004 | Hiereth et al. |
| 2004/0117515 A1 | 6/2004 | Sago et al. |
| 2004/0149736 A1 | 8/2004 | Clothier ..................... 219/627 |
| 2004/0253874 A1 | 12/2004 | Plishner |
| 2005/0052174 A1 | 3/2005 | Angelo et al. |
| 2005/0052287 A1 | 3/2005 | Whitesmith et al. ..... 340/825.72 |
| 2005/0068179 A1 | 3/2005 | Roesner ................... 340/572.1 |
| 2005/0076982 A1 | 4/2005 | Metcalf et al. ........... 152/152.1 |
| 2005/0093677 A1 | 5/2005 | Forster et al. |
| 2005/0111491 A1 | 5/2005 | Caveney |
| 2005/0215119 A1 | 9/2005 | Kaneko |
| 2005/0224585 A1 | 10/2005 | Durrant et al. ............. 235/492 |
| 2005/0231325 A1 | 10/2005 | Durrant et al. |
| 2005/0232636 A1 | 10/2005 | Durrant et al. ............. 398/139 |
| 2005/0259930 A1 | 11/2005 | Elkins et al. ............... 385/100 |
| 2005/0280511 A1 | 12/2005 | Yokoyama et al. |
| 2006/0044148 A1 | 3/2006 | Daniels et al. |
| 2006/0148279 A1 | 7/2006 | German et al. |
| 2006/0166546 A1 | 7/2006 | Ashizawa et al. |
| 2006/0232419 A1 | 10/2006 | Tomioka et al. |
| 2006/0233506 A1 * | 10/2006 | Noonan et al. ............. 385/134 |
| 2006/0257092 A1 * | 11/2006 | Lu et al. ................... 385/134 |
| 2006/0267778 A1 | 11/2006 | Gengel et al. |
| 2006/0282529 A1 | 12/2006 | Nordin |
| 2007/0013487 A1 | 1/2007 | Scholtz et al. |

| | | | | | |
|---|---|---|---|---|---|
| 2007/0015410 A1 | 1/2007 | Siemon et al. | JP | 2004-247090 | 9/2004 |
| 2007/0023525 A1 | 2/2007 | Son et al. | JP | 2004-264901 | 9/2004 |
| 2007/0032124 A1 | 2/2007 | Nordin et al. | JP | 2004-265624 | 9/2004 |
| 2007/0036506 A1 | 2/2007 | Kewitsch .................... 385/135 | JP | 2004-317737 | 11/2004 |
| 2007/0120684 A1 | 5/2007 | Utaka et al. | JP | 2004-349184 | 12/2004 |
| 2007/0152828 A1 | 7/2007 | Mohalik | JP | 2005-018175 | 1/2005 |
| 2007/0205897 A1 | 9/2007 | Forster | JP | 2004-033857 | 2/2005 |
| 2007/0216534 A1 | 9/2007 | Ferguson et al. | JP | 2005-050581 | 2/2005 |
| 2007/0236355 A1 | 10/2007 | Flaster et al. | JP | 2005-084619 | 3/2005 |
| 2007/0238343 A1 | 10/2007 | Velleca et al. | JP | 2005-086901 | 3/2005 |
| 2007/0241439 A1 | 10/2007 | Chung et al. | JP | 2005-087135 | 4/2005 |
| 2007/0247284 A1 | 10/2007 | Martin et al. | JP | 2005-092107 | 4/2005 |
| 2007/0290812 A1 * | 12/2007 | Tuttle ....................... 340/10.1 | JP | 2005-134125 | 5/2005 |
| 2008/0045075 A1 | 2/2008 | Caveney et al. | JP | 2005-216698 | 8/2005 |
| 2008/0106415 A1 | 5/2008 | Sellew et al. | JP | 2005-302403 | 10/2005 |
| | | | JP | 2005-315980 | 11/2005 |
| FOREIGN PATENT DOCUMENTS | | | JP | 2005-339983 | 12/2005 |
| DE | 19920452 | 11/2000 | JP | 2006-054118 | 2/2006 |
| DE | 10249414 | 5/2004 | JP | 2006-245983 | 9/2006 |
| EP | 1455550 A2 | 3/2004 | JP | 2006-279650 | 10/2006 |
| EP | 1455550 A2 | 9/2004 | JP | 2007-087849 | 4/2007 |
| GB | 2371211 A | 7/2002 | JP | 2007-088957 | 4/2007 |
| GB | 2371211 A | 4/2003 | JP | 2007-158993 | 6/2007 |
| JP | 03-242795 | 10/1991 | JP | 2007-189774 | 7/2007 |
| JP | 04-174406 | 6/1992 | JP | 2007-221400 | 8/2007 |
| JP | 2002-264617 | 9/2002 | WO | 03/098175 A1 | 11/2003 |
| JP | 2003-148653 | 5/2003 | WO | WO 03098175 A1 | 11/2003 |
| JP | 2003-172827 | 6/2003 | WO | 2004/030154 A2 | 4/2004 |
| JP | 2003-229215 | 8/2003 | WO | WO 2004030154 A2 | 4/2004 |
| JP | 2004-039389 | 2/2004 | WO | 2005/069203 A2 | 7/2005 |
| JP | 2004-142500 | 5/2004 | WO | WO 2005069203 A2 | 7/2005 |
| JP | 2004-152543 | 5/2004 | WO | WO 2008000656 A1 | 1/2008 |
| JP | 2004-245963 | 9/2004 | | | |

* cited by examiner

OPTICALLY ADDRESSED RFID ELEMENTS

TECHNICAL FIELD

The present invention relates generally to Radio Frequency Identification (RFID) elements. More particularly, the present invention concerns optically addressed RFID elements, and fiber optic connectors, cables, cable assemblies, network components, and systems employing such RFID elements.

BACKGROUND

Fiber optic cables are well known for connecting optical devices and systems. Some cables carry multiple fibers and have one or more connectors. "Pre-connectorized" cables have their connectors attached during manufacture, while others are terminated and have connectors attached upon installation. Cables known as patch cables, jumper cables, and fan-out cable assemblies are often relatively short and have one or more connectors at each end. In use, each connector will be placed within a port or socket located in a piece of equipment, patch panel, another connector, adaptor, etc.

As fiber optic equipment and networks become more common and more complex, the identification of proper cables, ports, and connectors for setting up and maintaining the systems accordingly becomes more complex. Therefore, indicia such as labels, hang tags, marking, coloration, and striping have been used to help identify specific fibers, cables, and/or connectors. While such indicia have been helpful in providing information to the technician setting up or servicing a system, further improvement could be achieved.

RFID systems can therefore be applied to fiber optic systems to provide information regarding fibers, connectors, components and ports. For example, RFID elements (comprising an antenna and an RFID integrated circuit chip, functioning as a transponder) could be attached to connectors and ports for use in identification. The RFID chip stores information for RF transmission. Typically, these RFID elements are proposed to be passive, rather than active, so they communicate the stored information in response to interrogation by an RF signal received by the RFID element antenna. An RFID reader comprising a transceiver that sends an RF signal to the RFID elements and reads the responsive RF signals communicated by the RFID elements can then interrogate the RFID elements to determine stored information about the cable, connector, component and/or port.

Semi-passive or active RFID elements may be powered by electrical connections, batteries, or the like. It is difficult to use such RFID elements in complicated electro-optical systems because of the cost and complexity of incorporating such powered systems. Essentially, separate power sources and connections must be provided for the various RFID elements, and batteries may have to be replaced from time to time. Where a system is built using individual, modular, and/or reconfigurable components, use of typical powered RFID systems is not advantageous. Therefore, a need exists for finding ways to use passive RFID elements advantageously in such applications.

BRIEF SUMMARY OF THE INVENTION

According to certain aspects of the invention, a component is disclosed for use with an optical fiber capable of carrying an optical signal, the component including a housing, the housing being connectable to the optical fiber, an optical tap attached to the housing, the optical tap directing a portion of the optical signal out of the optical fiber, a transducer attached to the housing in communication with the optical tap, the transducer generating an electrical signal responsive to the portion of the optical signal, and an RFID element attached to the housing, the RFID element including an integrated circuit in electrical communication with the transducer. When the optical fiber carries the optical signal the optical tap directs the portion of the optical signal out of the optical fiber and the transducer generates and transmits the electrical signal to the integrated circuit of the RFID element. Alternatively, the RFID element could be separated from the fiber optic component but still connected to the optical tap via an optical fiber or other means. Various options and modifications are possible.

For example, the transducer may include a photodetector and/or a transducer circuit. The photodetector may comprise a photodiode device or photovoltaic device.

If desired, the portion of the optical signal separated by the optical tap has an optical power of about 100 nW or more, sufficient to generate a distinct signal for the RFID element, and this power can be enhanced with a capacitor or energy storage device if necessary.

The transducer may be configured so that the electrical signal generated by the transducer at least partially provides power to the RFID element for communicating an RF signal to the RFID reader. Also, the transducer may be configured so that an electrical signal generated by the transducer at least partially provides power to the RFID element for writing data to the integrated circuit. If desired, the written data may include information regarding at least one of identification of the connection path of the optical fiber, the transmission state of the optical fiber, the date, and the time. Alternatively, the transducer may be configured so that an RF signal generated by the transducer is sent to the RFID element to communicate with it.

According to other aspects of the invention, a fiber optic cable is disclosed with detection capability, the cable including an optical fiber for carrying an optical signal, and a detection structure. The detection structure includes an optical tap disposed along the optical fiber for directing a portion of the optical signal out of the optical fiber and allowing a majority of the optical signal to pass, a transducer in communication with the optical tap, the transducer generating an electrical signal responsive to the portion of the optical signal directed out of the optical fiber by the optical tap, and an RFID element including an integrated circuit in electrical communication with the transducer. When the optical fiber carries the optical signal the optical tap directs the portion of the optical signal out of the optical fiber and the transducer generates and transmits the electrical signal to the integrated circuit of the RFID element. As above, various options and modifications are possible.

Also, the cable may further include a plurality of the detection structures disposed along the optical fiber at spaced intervals. The detection structures may generate electrical signals to their respective integrated circuits indicative of the transmission state of the optical fiber at the spaced intervals.

According to certain other aspects of the invention, an optically addressed RFID element is disclosed for use with an optical fiber capable of carrying an optical signal. The RFID element includes an optical tap disposable along the optical fiber for directing a portion of the optical signal out of the optical fiber and allowing a majority of the optical signal to pass. The RFID element also includes a transducer in communication with the optical tap and generating an electrical signal responsive to the portion of the optical signal directed out of the optical fiber by the optical tap. The RFID element further includes an integrated circuit configured for RFID function and in electrical communication with the transducer. The RFID element also comprises an antenna in electrical communication with the integrated circuit. When the optical fiber carries the optical signal, the optical tap directs the portion of the optical signal out of the optical fiber and the transducer generates and transmits the electrical signal to the integrated circuit. As above, various options and modifications are possible.

According to still other aspects of the invention, a communications system is disclosed including a plurality of interconnected communications components and a plurality of optical fibers, a plurality of RFID elements, the RFID elements attached to one or more of the plurality of interconnected communications components proximate the optical fibers, the RFID elements being optically addressed RFID elements. The RFID elements include an optical tap disposable along one of the optical fibers for directing a portion of the optical signal out of the optical fiber and allowing a majority of the optical signal to pass, a transducer in communication with the optical tap, the transducer generating an electrical signal responsive to the portion of the optical signal directed out of the optical fiber by the optical tap, an integrated circuit configured for RFID function and in electrical communication with the transducer, and an antenna in electrical communication with the integrated circuit, whereby when the optical fiber carries the optical signal the optical tap directs the portion of the optical signal out of the optical fiber and the transducer generates and transmits the electrical signal to the integrated circuit, and the integrated circuit communicates with an RF receiver for receiving RF signals from the antennas. As above, various options and modifications are possible.

If desired, the transducers may be configured so that the electrical signals generated by the transducers at least partially provide power to the respective integrated circuits and antennas for communicating RF signals to the RF receiver. The transducers may be configured so that electrical signals generated by the transducers at least partially provide for writing data to the respective integrated circuits. The written data may include information regarding at least one of identification of the connection path of the optical fibers, the transmission state of the optical fibers, the date and the time. The transducers may also be configured to provide an RF signal to the RFID element to communicate with it via known RFID commands. The RF receiver may comprise a transceiver that provides power to the respective integrated circuits and antennas for communicating responsive RF signals to the RF receiver including the data.

It is to be understood that both the foregoing general description and the following detailed description present examples of different aspects of the invention, and are intended to provide an overview or framework for understanding the nature and character of the aspects of the invention as it is claimed. The accompanying drawings are included to provide a further understanding of the different aspects of the invention, and are incorporated into and constitute a part of this specification.

DETAILED DESCRIPTION OF THE PREFERRED EMBODIMENTS

Reference will now be made in detail to the present preferred embodiments of the invention, examples of which are illustrated in the accompanying drawings. Whenever possible, like or similar reference numerals will be used throughout the drawings to refer to like or similar parts. FIGS. 1-4 show examples of optically addressed RFID elements, and of connectors, cables, cable assemblies, communications components, and systems in which such RFID elements are employed. The exemplary embodiments employ optically addressed RFID technology to allow for simple, reliable, and/or unobtrusive powering of RFID elements and/or sending RF signals to RFID elements and/or writing of data to RFID element integrated circuits. It should be understood that the embodiments disclosed herein are merely examples, each incorporating certain aspects and benefits of the present invention. Various modifications and alterations may be made to the following examples within the scope of the present invention, and aspects of the different examples may be mixed in different ways to achieve yet further examples. Accordingly, the true scope of the invention is to be understood from the entirety of the present invention, in view of, but not limited to, the following examples.

Figure 1:
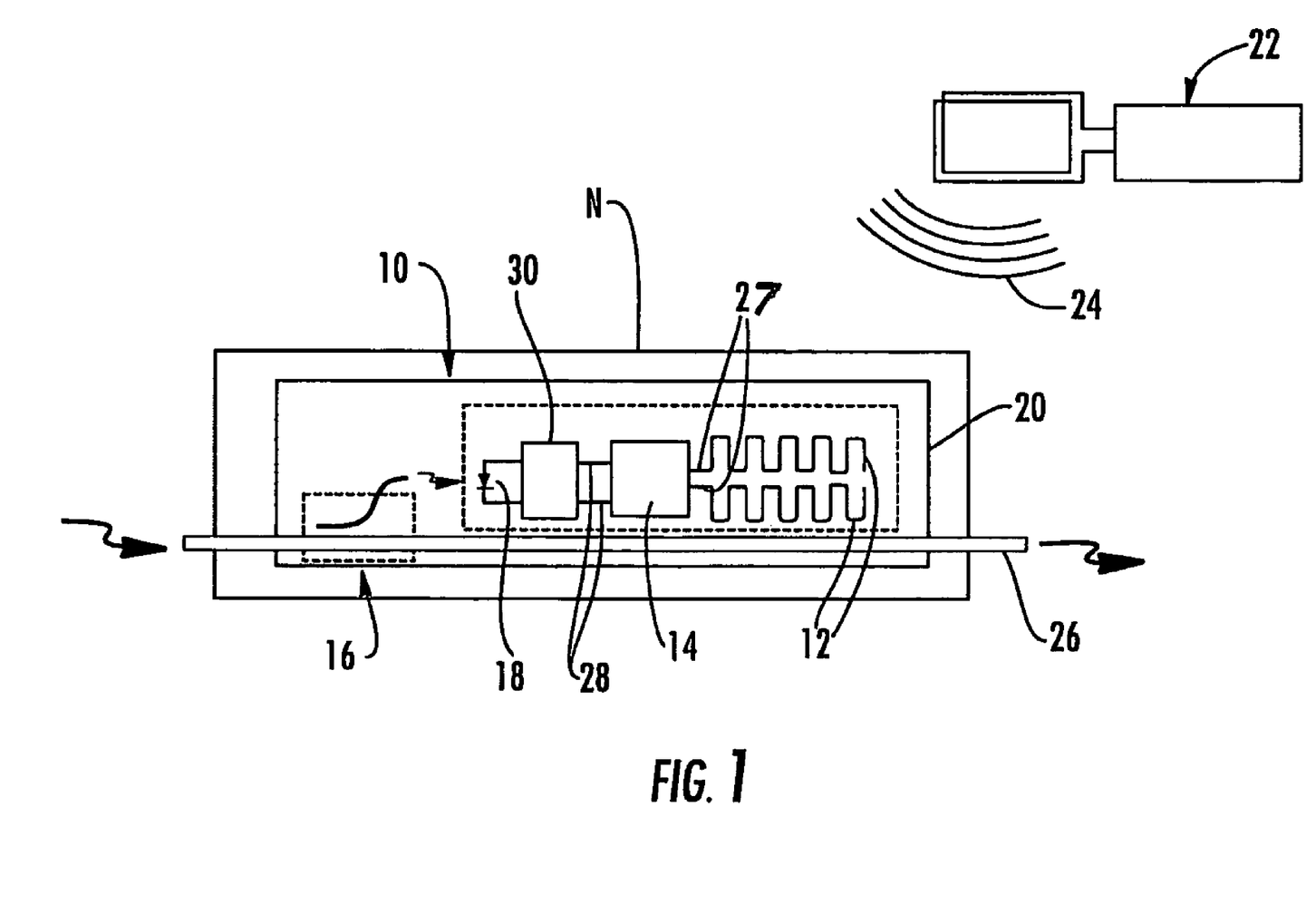
FIG. 1 is a representative schematic view of an optically addressed RFID element used with a network component according to a first embodiment of the invention, along with a source of external RF signals.

FIG. 1 shows a first example of an optically addressed RFID element 10 according to certain aspects of the invention. As used herein, the term "optically addressed" shall include, but not be limited to, the ability of the RFID element 10 to write data to the RFID element using an optical signal, to send an RF signal to the RFID element using the optical signal, and/or to at least partially power the RFID element using the optical signal. As illustrated, RFID element 10 includes an antenna 12, an integrated circuit 14, a schematically-represented optical tap 16, and a transducer 18. A base 20 may be provided to support elements 12-18. Source 22 of external RF signal 24, such as a reader, transceiver, or the like, for use with RFID element 10, is also illustrated. RFID element 10 is illustrated disposed attached to a network component N adjacent an optical fiber 26. Network component N may comprise any piece of communication equipment carrying optical signals and/or optical fibers.

RFID element 10 may, if desired, operate in some ways as does a conventional RFID element, namely by receiving external RF signal 24 from a reader, transceiver or the like via antenna 12. Integrated circuit 14, in electrical communication with antenna 12 via electrical connections 27, may process the received signal and respond in any of various ways. For example, integrated circuit 14 may send an electrical signal to antenna 12 causing a return RF signal to be communicated to an RFID reader. Source 22 and/or any other RF reading devices within the range of the return RF signal can receive and process the return RF signal. Such functionality can be used for example to identify the presence, location, or status of RFID element 10 or a plurality of such elements, as desired in various applications. Information transmitted by external signal 24 may be stored in the integrated circuit or other structure on RFID element 10, if desired, for example to assign an identification number to the RFID element, or to write data to the memory of integrated circuit 14.

RFID element 10 may be attached to any sort of device providing an optical input, such as optical fiber 26, or to any device part, or location, limited only by the size and shape of the RFID element and the application. Generally, signal power received by an RFID element will vary inversely with the square of distance between the RF source 24 and the RFID element 10. The strength of signal available, RF signal fading, interference and noise of the source 22 and RFID element 10, and the surrounding environment of use, etc. may also have an impact on the utilization of RFID element 10 and affect its performance and read range.

Transducer 18 of RFID element 10 is electrically connected to integrated circuit 14 via electrical connections 28. A transducer circuit 30 may be included between the transducer 18 and the integrated circuit 14 for processing the electrical signals generated by the transducer.

Optical tap 16 is disposed adjacent optical fiber 26 so as to re-direct a portion of an optical signal traveling through the optical fiber. The transducer 18 is disposed near enough the optical tap 16 so that it can receive at least some of the portion of light directed out of the optical fiber 26 by the optical tap. The transducer 18 generates an electrical signal in response based on the light it receives. The electrical signal is transmitted to the integrated circuit 14 via electrical connections 28 and transducer circuit 30, if present. Transducer 18 may comprise a photodiode, as illustrated, or a photovoltaic device, although any optical-electrical transducer and necessary processing structure and/or circuitry could be employed.

Optical tap 16 is schematically illustrated in the figures for clarity. The optical tap functions to split out a portion of the light signal traveling along the optical fiber 26 without impeding the ability of the fiber to carry out its communication task. It should be understood that various structures and configurations could comprise an optical tap 16, as used herein. For example, optical tap 16 could comprise application of microfiber bends to optical fiber 26. Alternatively, the fiber waveguide could be situated proximate a tap waveguide, so that optical power is coupled from the fiber waveguide to the tap waveguide. Also, the core of the optical fiber 26 could be thermally expanded and/or optical gratings could be written on the core. Optical tap 16 thus removes light out of the fiber core and into its cladding, and then outward to a photodetector or the like. To improve extraction of light from the cladding, an index-matching fluid could be employed. Also, providing a degree of surface roughness to the cladding, or providing notches or thinning via polishing could be employed to enhance extraction of light from the fiber. Therefore, various techniques can be used, if desired, to assist in the extraction of light from the optical fiber. All such structure may be considered a portion of an optical tap, as used herein.

The electrical signal generated by transducer 18 may be transmitted to integrated circuit 14 for one or more purposes. For example, the electrical signal may be used to write data to integrated circuit 14, including data regarding whether the optical fiber 26 has optical power propagating in it (i.e. it is active), the time of activity, or other parameters related to the optical signal. Therefore, when RFID element 10 receives the external RF signal 24, the RFID element can responsively transmit the already-written data via a RF signal. Such data writing could also occur upon receipt of the RF signal 24. Alternatively, the electrical signal generated by transducer 18, rather than an external RF signal 24, itself may be used to power an RF signal transmitted by the RFID element 10. In such case no external RF signal or external power source is required for the RFID element to send a signal. If desired, the electrical signal from transducer 18 and the external RF signal 24 could both power the RFID element 10 to enable communication with the RFID reader.

Optical tap 16 can be designed so as to provide a predetermined, desired power level for RFID element 10. For example, if an optical signal being carried by optical fiber 26 has a nominal strength of about 1 mW (0 dB), a 1% tap of the signal would provide an electrical signal with a power in the range of about 10 µW. Such power level is on the order necessary to power and operate an integrated circuit of an RFID element; however, further embodiments of the present invention may include a tap of any amount (or percentage) of signal/power. In some embodiments of the present invention, operation of the integrated circuit includes, but is not limited to, the writing of data to the integrated circuit; the sending of RF signals; communication between multiple RFID elements; the monitoring and/or control of sensors, actuators, and the like; and so forth. Higher optical signal levels would allow a smaller tap percentage. If desired or required, a passive storage device such as a capacitor or trickle-fill battery could be used to store and discharge energy either one time or over a duty-cycle if the optical tap and/or optical signal strength are not powerful enough to operate an RFID integrated circuit. For many fiber optic cable applications, where the RFID element 10 is used to detect optical power propagating in the fiber or the transducer writes data to the RFID element 10, a tap that provides about 100 nW or more of optical power to the transducer will provide suitable electrical power to perform functions related to the RFID element without causing optical signal loss to an undesirable level. However, the various characteristics of the elements above can be selected to meet various different operational parameters.

In addition, further embodiments of the present invention include energy storage devices, such as capacitors and batteries, to provide two non-limiting examples of energy storage devices, to enable the transducer to detect optical power propagating in the optical fiber at times when the RFID element is not being powered by external RF signals or external power sources. The detection by the transducer may be constant, periodic, on-demand, or at any time interval or selective instruction in order to provide certain desired information about the presence, power level, or other parameters of the optical signal. In certain embodiments of the present invention, the transducer comprises one or more photodiodes having a sensitivity about −40 dBm for measuring the optical signals in a fiber within a time period of about 100 msec to about 500 msec with such measurements taken at predetermined or selected intervals, such as once a minute to provide a non-limiting example. Still further embodiments of the present invention comprise alternative transducers and/or alternative energy storage devices in order to detect optical power propagating in the optical fiber at times when the RFID element is not being powered by external RF signals or external power sources.

In addition, certain embodiments of the present invention utilize the optical signal to communicate RF signal data to one or more RFID elements in the communications system. In such embodiments, the optical signal includes encoded RF modulated data that can be written to the integrated circuit of the RFID element and/or directly communicated by the antenna of the RFID element. Still further embodiments of the present invention comprise alternative methods for providing data to the RFID element via the optical signal.

Because the direction of the optical signal to be carried through the optical fiber is not always known at the time of assembly of the communications system (such as in a first direction along the optical fiber and/or in a second direction generally opposite the first direction), certain embodiments of the present invention include an optical tap arrangement that is adapted to direct a portion of the optical signal carried in both the first direction and the second direction. More specifically, some of these embodiments include an optical tap that comprises a first optical tap adapted to direct a portion of the optical signal carried in the first direction and a second optical tap adapted to direct a portion of the optical signal carried in the second direction. In addition, other of these embodiments include an optical directional coupler that is adapted to direct a portion of the optical signal carried in both the first direction and the second direction to a single transducer 18 that is in electrical communication with the RFID integrated circuit 14. Still further embodiments of the present invention include alternative optical taps to enable the transducer to be in optical communications with optical signals carried in two directions along the optical fiber.

Figure 2:
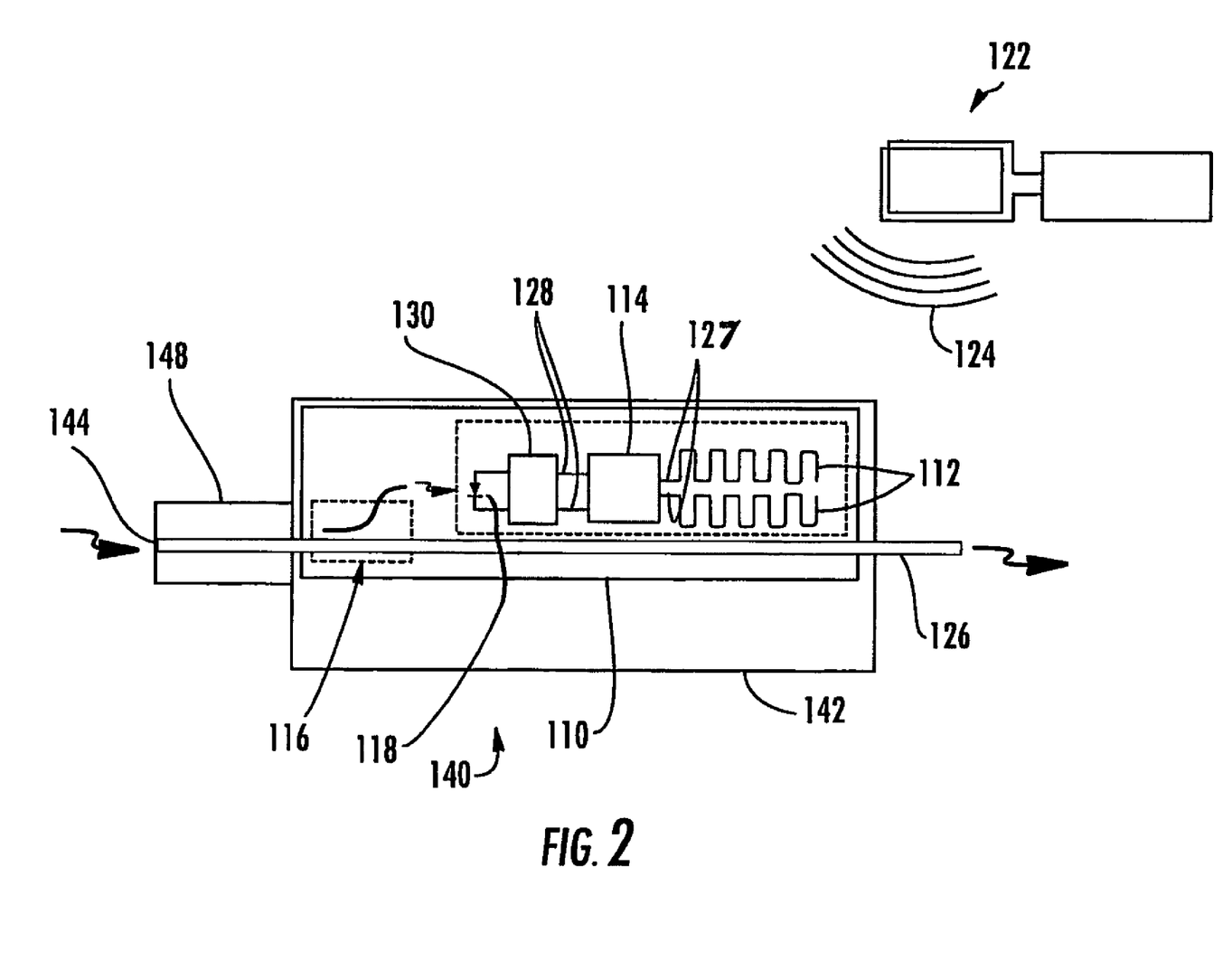
FIG. 2 is a representative schematic view of a fiber optic component according to certain aspects of the invention and including an optically addressed RFID element as in FIG. 1, along with a source of external RF signals.

FIG. 2 shows a fiber optic component 140 incorporating an optically addressed RFID element 110 similar to element 10 above. Operation of RFID element 110 is similar to that described above. Optical tap 116 directs a portion of the optical signal passing through optical fiber 126 to transducer 118 generating an electrical signal transmitted through electrical connections 128 to integrated circuit 114. The electrical signal may cause antenna 112 to communicate an RF signal or may merely write information to the integrated circuit 114 or may provide sufficient power to operate the integrated circuit 114 enabling communication over a longer range between the RFID element 110 and the RFID reader. All options and modifications discussed above may be employed, as relevant to a connector.

Component 140 may be any type of fiber optic device, such as a connector of optical fibers, or a transmitter, or a receiver, or a WDM multiplexer, or a cable assembly, or any other device used as part of a fiber optic system. As shown for illustrative purposes only, component 140 includes a housing 142 connected to an end 144 of optical fiber 126. Component 140 also may include a termination ferrule 148. Component 140 may comprise any suitable type of component design, whether for a single or multiple fiber cable, and no limitation on type or configuration of component should be implied.

Integrated circuit 114 may include stored information such as serial number, type of component, cable type, manufacturer, manufacturing date, installation date, location, lot number, performance parameters (such as attenuation measured during installation), identification of what is at other end of the cable, etc. Such information could be preloaded on integrated circuit 114 at manufacture or upon installation via source 122. Any of this information or other information may serve as identifying indicia for component 140 that may be assigned or polled by an RF source and/or reader. Further, various types of information can be determined and written to integrated circuit 114, such as line status, time of transmission or ceasing of transmission, or any parameters discernable from the optical signal, with use of integrated circuit 114 and/or transducer circuit 130. Therefore, the types of information that can be determined, written, stored, and/or transmitted using the structures disclosed herein are limited only by the application in which the structures are employed.

Figure 3:
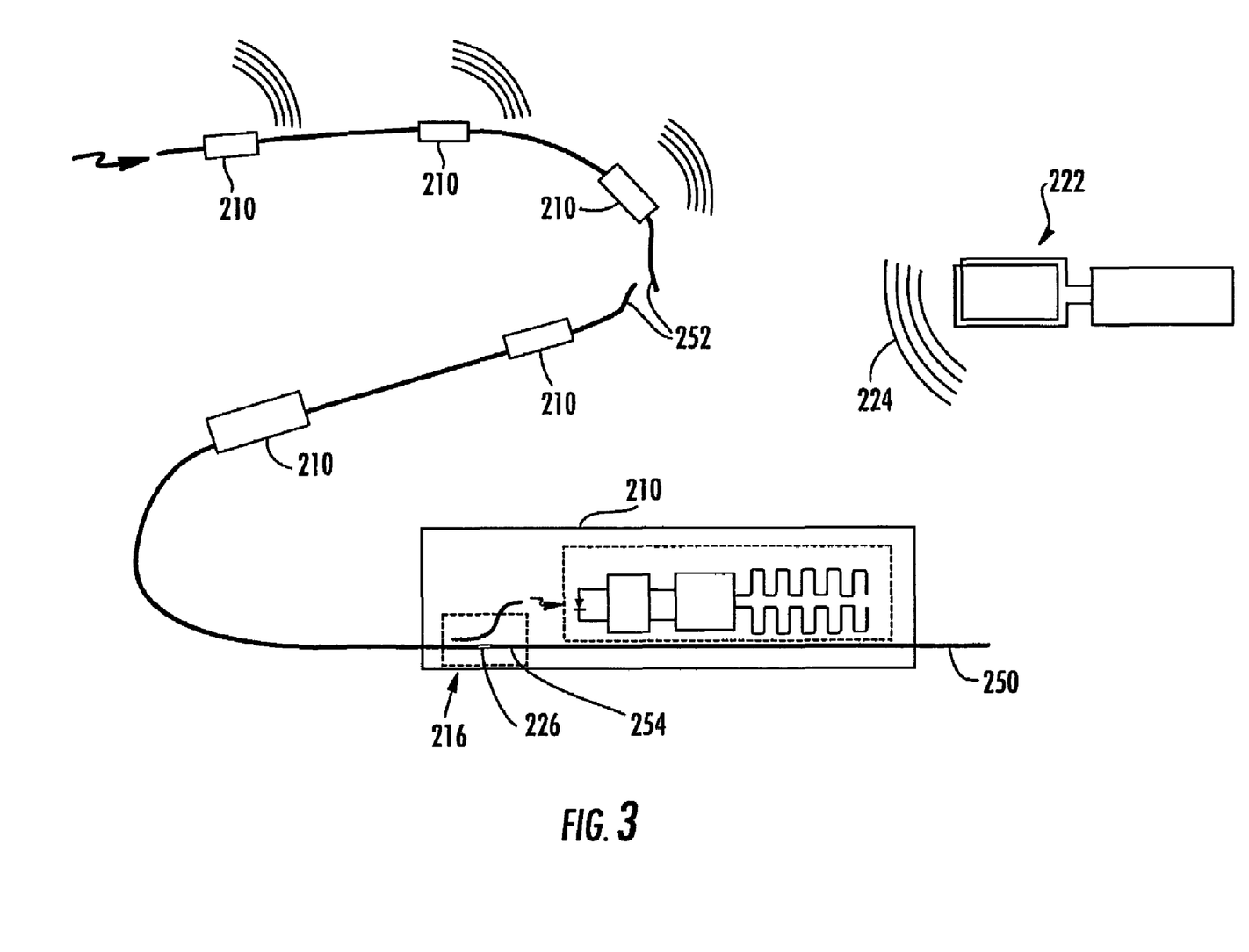
FIG. 3 is a representative schematic view of a fiber optic cable according to certain aspects of the invention and including an optically addressed RFID element as in FIG. 1, along with a source of external RF signals.

FIG. 3 shows an embodiment in which an optically addressed RFID element 210 is attached to a fiber optic cable 250 at a position spaced from either end of the cable. As shown, multiple optically addressed RFID elements 210 (similar to element 10 above, with similar reference numerals) are employed at spaced intervals. Optically addressed RIFD element 210 may operate as described above. Also, use of a plurality of such RFID elements 210 located along a given fiber optic cable 250 at spaced intervals can provide the added benefit of tracing an optical signal along a cable spanning long distances, or in detecting a break 252 in the cable. Similarly, a disconnection between cables or network components can be detected and localized by identifying which RFID elements indicate that power is propagating and which RFID elements indicate that no power is propagating. This information determines how far along a signal path the optical signal may be detected by the plurality of RFID elements.

As schematically shown, a section of the cable 250, collectively represented by element 254, may need to be replaced by the optically addressed RFID element 210. Cable 250 is illustrated as having a single optical fiber 226 exposed adjacent optical tap 216. If desired, a single optical tap structure may be configured to direct optical signals from more than one fiber within a cable. Also, multiple optically addressed RFID elements 210 may be employed at a given location along a multi-fiber cable, one per fiber. Cable 250 may also have a connector as in FIG. 2 attached at one or both ends, if desired. Thus, the structures of FIG. 3 should be considered illustrative only.

Figure 4:
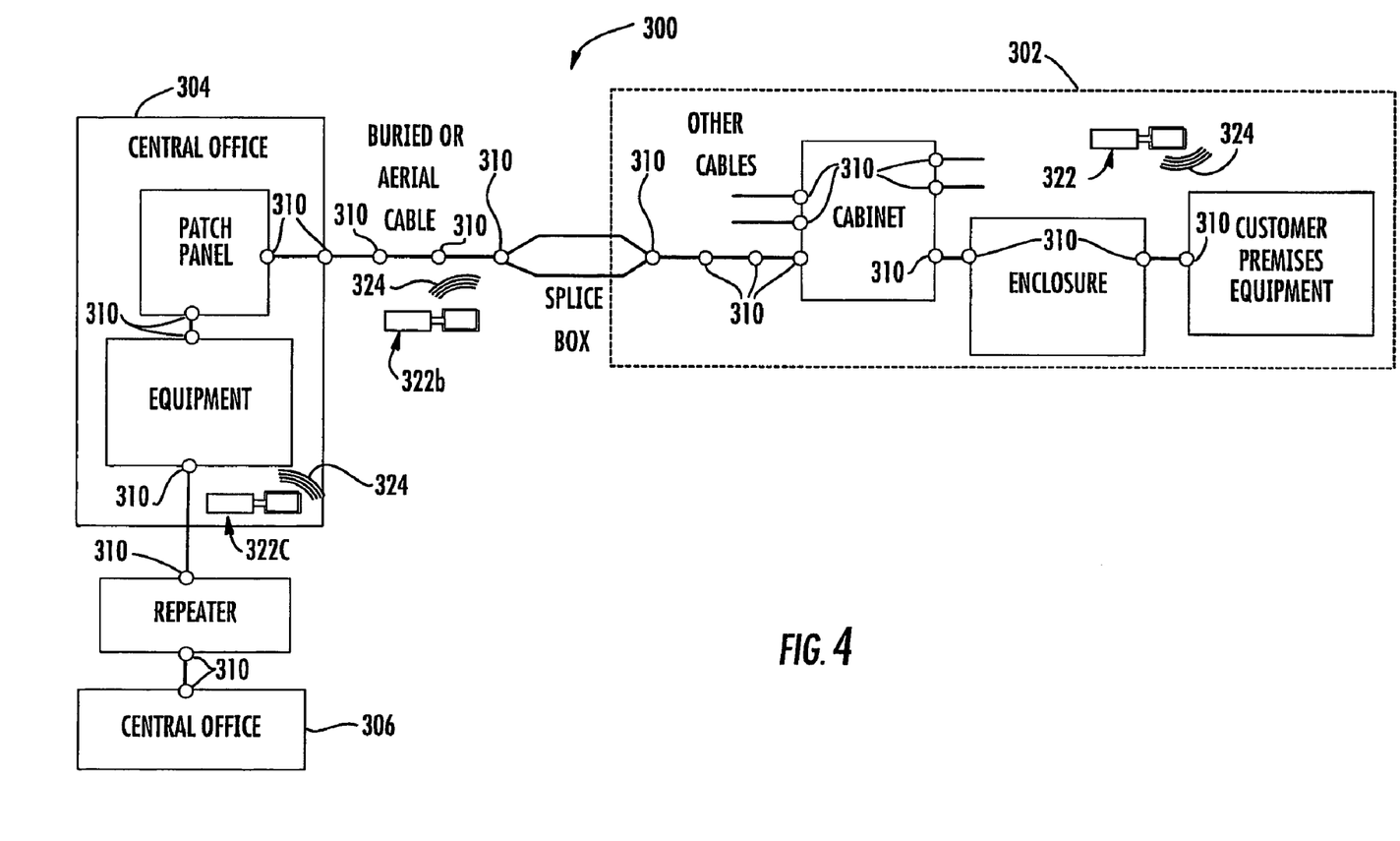
FIG. 4 is a representative schematic view of a system according to certain aspects of the invention and including a plurality of optically addressed RFID elements, along with a plurality of sources of external RF signals.

FIG. 4 shows a representative system 300 having multiple optically adressed RFID elements 310 functioning as signaling devices. System 300 includes customer premises 302, a LEC central office 304, a remote central office 306, and a plurality of external RF signal sources 322, 322b, 322c, which may comprise readers for sending and receiving signals 324. Sources 322 and 322c are fixed in location, and source 322b is mobile, for example hand-held.

Each optically addressed RFID element 310 can tap the associated optical fiber signal to provide an optical signal, if desired, to each RFID element. For example, each RFID element 310 could continuously or periodically be read by a nearby RFID reader, confirming whether the associated optical fiber is active and/or provide information regarding or carried by the optical signal. The respective integrated circuits and antennas could be powered via the optical taps. Alternatively, the optical taps could simply be used to write data to the integrated circuits for reading via receipt of external RF signals 324 and responsive transmissions. It should be understood that combinations of optically addressed RFID elements and non-optically addressed RFID elements could be used in such a system, or with any of the devices within the system or discussed above.

Thus, various identifying indicia may be assigned to various network components for use by an RF system. The identifying indicia may be preprogrammed into the integrated circuit chip within the RFID element and/or it may be assigned or modified at installation and stored in the integrated circuit chip. The technician may thus identify all connectors manufactured on a certain date, or a certain type, installed on a certain date, that are fully connected, that are carrying signal, etc. Other inputs to the integrated circuit are also possible, such as temperature sensors, humidity sensors, etc., which can also serve as identifying indicia. Additional purposes and applications for use of the optically addressed RFID element within optical networks are also available.

Thus, it will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A component for use with an optical fiber capable of carrying an optical signal, the component comprising:
   a housing, the housing being connectable to an end of the optical fiber;
   an optical tap attached to the housing, the optical tap configured to direct a portion of an optical signal out of the optical fiber;
   a transducer attached to the housing in communication with the optical tap, the transducer configured to generate an electrical signal responsive to the portion of the optical signal; and
   a passive RFID element attached to the housing, the passive RFID element including an integrated circuit in electrical communication with the transducer, whereby when the optical fiber carries the optical signal, the optical tap directs the portion of the optical signal out of the optical fiber and the transducer generates and transmits the electrical signal to the integrated circuit of the passive RFID element.

2. The component of claim 1, wherein the transducer includes a photodiode device.

3. The component of claim 2, wherein the transducer includes a transducer circuit.

4. The component of claim 1, wherein the transducer includes a photovoltaic device.

5. The component of claim 1, wherein the portion of the optical signal separated by the optical tap has an optical power sufficient to be detected by the integrated circuit of the passive RFID element.

6. The component of claim 1, further comprising an energy storage device in electrical communication with the transducer.

7. The component of claim 1, wherein the transducer is adapted to provide an indication of the presence of optical signals carried in the optical fiber.

8. The component of claim 1, wherein transducer is configured so that the electrical signal generated by the transducer at least partially provides power to the passive RFID element.

9. The component of claim 1, wherein the transducer is configured to write data from the electrical signal to the integrated circuit.

10. The component of claim 9, wherein the transducer is configured to generate the electrical signal by being configured to generate an electrical signal that includes an RF signal representing an RF signal encoded in the optical signal.

11. The component of claim 10, wherein the integrated circuit is configured to receive and write the RF signal to a memory of the integrated circuit.

12. The component of claim 9, wherein the transducer is configured to write the electrical signal representing optical data included in the optical signal to a memory of the integrated circuit.

13. The component of claim 1, wherein the optical signal can be carried in both a first direction and a second direction opposite the first direction, and wherein the optical tap comprises a directional coupler adapted to direct to the transducer a portion of the optical signal carried in both the first direction and the second direction.

14. The component of claim 1, wherein the optical signal can be carried in both a first direction and a second direction opposite the first direction, and wherein the optical tap comprises a first optical tap adapted to direct to the transducer a portion of the optical signal carried in the first direction and wherein the optical tap comprises a second optical tap adapted to direct to the transducer a portion of the optical signal carried in the second direction.

15. A fiber optic cable with detection capability comprising:
   an optical fiber for carrying an optical signal, and;
   a detection structure including:
      an optical tap disposed along the optical fiber configured to direct a portion of an optical signal out of the optical fiber and allowing a majority of the optical signal to pass;
      a transducer in communication with the optical tap, the transducer configured to generated an electrical signal responsive to the portion of the optical signal; and
      a passive RFID element including an integrated circuit in electrical communication with the transducer, whereby when the optical fiber carries the optical signal the optical tap directs the portion of the optical signal out of the optical fiber and the transducer generates and transmits the electrical signal to the integrated circuit of the passive RFID element.

16. The cable of claim 15, wherein the transducer includes a photodiode device.

17. The cable of claim 16, wherein the transducer includes a transducer circuit.

18. The cable of claim 15, wherein the transducer includes a photovoltaic device.

19. The cable of claim 15, wherein the portion of the optical signal separated by the optical tap has an optical power sufficient to be detected by the integrated circuit of the passive RFID element.

20. The cable of claim 15, further comprising an energy storage device in electrical communication with the transducer.

21. The cable of claim 15, wherein the transducer is adapted to provide an indication of the presence of optical signals carried in the optical fiber.

22. The cable of claim 15, wherein the transducer is configured to generate the electrical signal by being configured to generate an electrical signal that includes an RF signal representing an RF signal encoded in the optical signal.

23. The cable of claim 15, wherein the transducer is configured to write data from the electrical signal to the integrated circuit.

24. The cable of claim 23, wherein the integrated circuit is configured to receive and write the RF signal to a memory of the integrated circuit.

25. The cable of claim 23, wherein the transducer is configured to generate the electrical signal by being configured to generate an electrical signal that includes an RF signal representing an RF signal encoded in the optical signal.

26. The cable of claim 25, wherein the transducer is configured to write the electrical signal representing optical data included in the optical signal to a memory of the integrated circuit.

27. The cable of claim 15, further including a plurality of the detection structures disposed along the optical fiber at spaced intervals.

28. The cable of claim 27, wherein the detection structures generate electrical signals to their respective integrated circuits indicative of the transmission state of the optical fiber at the spaced intervals.

29. The cable of claim 15, wherein the optical signal can be carried in both a first direction and a second direction opposite the first direction, and wherein the optical tap comprises a directional coupler adapted to direct to the transducer a portion of the optical signal carried in both the first direction and the second direction.

30. The cable of claim 15, wherein the optical signal can be carried in both a first direction and a second direction opposite the first direction, and wherein the optical tap comprises a first optical tap adapted to direct to the transducer a portion of the optical signal carried in the first direction and wherein the optical tap comprises a second optical tap adapted to direct to the transducer a portion of the optical signal carried in the second direction.

31. An optically addressed-RFID element for use with an optical fiber capable of carrying an optical signal, comprising:
an optically addressed RFID element, comprising:
an optical tap disposed along the optical fiber configured to direct a portion of an optical signal out of the optical fiber and allowing a majority of the optical signal to pass;
a transducer in communication with the optical tap, the transducer configured to generate an electrical signal responsive to the portion of the optical signal directed out of the optical fiber by the optical tap;
an integrated circuit configured for passive RFJD function and in electrical communication with the transducer; whereby when the optical fiber carries the optical signal the optical tap directs the portion of the optical signal out of the optical fiber and the transducer generates and transmits the electrical signal to the integrated circuit; and
an antenna in electrical communication with the integrated circuit for communication with an RFID reader.

32. The optically addressed RFID element of claim 31, wherein the transducer includes a photodiode device.

33. The optically addressed RFID element of claim 32, wherein the transducer includes a transducer circuit.

34. The optically addressed RFID element of claim 31, wherein the transducer includes a photovoltaic device.

35. The optically addressed RFID element of claim 31, wherein the portion of the optical signal separable by the optical tap has an optical power sufficient to be detected by the integrated circuit of the RFID element.

36. The optically addressed RFID element of claim 31, wherein transducer is configured so that the electrical signal generated by the transducer at least partially provides power to the integrated circuit and antenna for communicating an RF signal.

37. The optically addressed RFID element of claim 31, wherein the transducer is configured to write data from the electrical signal to the integrated circuit.

38. A communications system comprising:
a plurality of interconnected communications components and a plurality of optical fibers;
a plurality of passive RFID elements, the passive RFID elements attached to one or more of the plurality of interconnected communications components proximate the optical fibers, the passive RFID elements being optically addressed RFID elements and including:
an optical tap disposed along one of the optical fibers configured to direct a portion of the optical signal out of the optical fiber and allowing a majority of the optical signal to pass;
a transducer in communication with the optical tap, the transducer configured to generate an electrical signal responsive to the portion of the optical signal directed out of the optical fiber by the optical tap;
an integrated circuit configured for passive RFID function and in electrical communication with the transducer, whereby when the optical fiber carries the optical signal the optical tap directs the portion of the optical signal out of the optical fiber and the transducer generates and transmits the electrical signal to the integrated circuit;
an antenna in electrical communication with the integrated circuit; and
an RF receiver for receiving RF signals from the antennas.

39. The system of claim 38, wherein the transducers are configured so that the electrical signals generated by the transducers at least partially provide power to the respective integrated circuits for communicating RF signals to the RF receiver.

40. The system of claim 38, further comprising an energy storage device in electrical communication with the transducer.

41. The system of claim 40, wherein the transducer is adapted to provide an indication of the presence of optical signals carried in the optical fiber.

42. The system of claim 38, wherein the transducers are configured to write electrical signals to the respective integrated circuits.

43. The system of claim 42, wherein the RF receiver comprises a transceiver configured to provide power to the respective integrated circuits and antennas for communicating responsive RF signals to the RF receiver including the data.

44. The system of claim 38, wherein the optical signal can be carried in both a first direction and a second direction opposite the first direction, and wherein the optical tap comprises a directional coupler adapted to direct to the transducer a portion of the optical signal carried in both the first direction and the second direction.

45. The system of claim 38, wherein the optical signal can be carried in both a first direction and a second direction opposite the first direction, and wherein the optical tap comprises a first optical tap adapted to direct to the transducer a portion of the optical signal carried in the first direction and wherein the optical tap comprises a second optical tap adapted to direct to the transducer a portion of the optical signal carried in the second direction.

* * * * *